US012020853B2

(12) United States Patent
Ricco

(10) Patent No.: US 12,020,853 B2
(45) Date of Patent: Jun. 25, 2024

(54) METHOD OF MANUFACTURING INDUCTORS

(71) Applicant: Tesla, Inc., Austin, TX (US)

(72) Inventor: Tobias S. Ricco, Redwood City, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 18/349,588

(22) Filed: Jul. 10, 2023

(65) Prior Publication Data

US 2024/0013971 A1 Jan. 11, 2024

Related U.S. Application Data

(60) Continuation of application No. 17/816,133, filed on Jul. 29, 2022, now Pat. No. 11,699,548, which is a division of application No. 16/363,838, filed on Mar. 25, 2019, now Pat. No. 11,404,201.

(60) Provisional application No. 62/647,892, filed on Mar. 26, 2018.

(51) Int. Cl.

| | |
|---|---|
| ***H01F 27/30*** | (2006.01) |
| ***H01F 27/02*** | (2006.01) |
| ***H01F 27/26*** | (2006.01) |
| ***H01F 27/28*** | (2006.01) |
| ***H01F 41/02*** | (2006.01) |

(52) U.S. Cl.
CPC ........... *H01F 27/306* (2013.01); *H01F 27/02* (2013.01); *H01F 27/266* (2013.01); *H01F 27/2823* (2013.01); *H01F 27/2895* (2013.01); *H01F 41/02* (2013.01); *Y10T 29/4902* (2015.01); *Y10T 29/5313* (2015.01)

(58) Field of Classification Search
CPC ..... H01L 23/5227; H01L 28/10; H01F 17/04; H01F 27/306; H01F 41/06; H01F 27/28; H01F 37/00; H01F 17/0033; H01F 41/02; H01F 38/00; Y10T 29/49073; Y10T 29/4902; Y10T 29/5313
USPC ............... 29/602.1, 604, 605, 606, 729, 740
See application file for complete search history.

(56) References Cited

U.S. PATENT DOCUMENTS

| | | | | |
|---|---|---|---|---|
| 3,548,347 | A | 12/1970 | Miller | |
| 6,357,107 | B2 | 3/2002 | Ahn | |
| 8,125,777 | B1 * | 2/2012 | MacLennan ............ | H01F 27/10 361/689 |

(Continued)

*Primary Examiner* — Thiem D Phan
(74) *Attorney, Agent, or Firm* — Knobbe, Martens, Olson & Bear, LLP

(57) ABSTRACT

A structure for forming inductor windings includes a first portion and a second portion of a clamshell casing. The first portion includes a first set of electrically conductive segments, a first inner carrier, and a first outer carrier. The second portion includes a second set of electrically conductive segments, a second inner carrier, and a second outer carrier. An inductor core is mountable between the first inner carrier and the first outer carrier within the first portion. A control assembly aligns and joins the first portion to the second portion of the clamshell casing such that the first set of electrically conductive segments arranged in the first pattern that correspond to first half-turns of the inductor windings, are attached to the second set of electrically conductive segments arranged in the second pattern that correspond to second half-turns of the inductor windings, to form continuous turns around the inductor core.

12 Claims, 4 Drawing Sheets

(56) References Cited

U.S. PATENT DOCUMENTS

| | | | | |
|---|---|---|---|---|
| 8,922,311 | B2 | 12/2014 | Pal | |
| 9,006,862 | B2 * | 4/2015 | Palumbo | H01L 23/5227 257/E21.002 |
| 11,404,201 | B2 | 8/2022 | Ricco | |
| 11,699,548 | B2 | 7/2023 | Ricco | |
| 2019/0378641 | A1 | 12/2019 | Kang | |

* cited by examiner

METHOD OF MANUFACTURING INDUCTORS

CROSS REFERENCE TO RELATED PATENTS

The present U.S. Utility Patent application claims priority pursuant to 35 U.S.C. § 119(e) to U.S. Provisional Application No. 62/647,892, entitled "INDUCTOR WINDINGS FORMING APPARATUS AND METHOD OF MANUFACTURING INDUCTORS", filed Mar. 26, 2018, which is hereby incorporated herein by reference in its entirety and made part of the present U.S. Utility Patent Application for all purposes.

BACKGROUND

Field

The present disclosure relates to inductor winding technologies and more specifically, to forming inductor windings of an inductor that exhibit consistent inductance in a high-volume, efficient manufacturing of inductors.

Background

The development of more sophisticated power electronics, which rely on precisely manufactured operational components, has created a demand for certain power electronic components that use high-precision manufacturing techniques. One of such power electronic components is an inductor, which is widely used, for example, in battery chargers, inverters, DC-DC converters, electromagnetic interference (EMI) filters, radio equipment, and more generally power conversion systems (PCS), for example, PCS of electric vehicles. Typically, the amount of time and precision required to form inductor windings, for example, turns of copper or aluminum wire, around a preformed core determines a majority of the total cycle time and cost of manufacturing an inductor.

Currently, inductors are manufactured by certain conventional methods, where an extruded copper or aluminum wire is wound around a preformed core using a winding machine or by hand. The conventional methods of forming inductor windings require ample precision, and at times, imperfections may arise in the inductor windings, which may further cause significant variations in inductance from a desired value of inductance. Such conventional methods are time consuming and prone to errors, which further translate to an increase in manufacturing costs. Further, in certain scenarios, during assembly of inductive circuits, leads of conventionally produced inductive windings require precise positioning with respect to terminals on different printed circuit board assemblies (PCBAs) or power electronic components. In such scenarios, additional effort, for example, support from technicians or other devices, may be required to achieve suitable positioning of the leads. Such additional effort increases assembly time, cost, and assembly automation-related challenges, and adversely affects the overall production yield.

Further limitations and disadvantages of conventional and traditional approaches will become apparent to one skill in the art, through comparison of described systems with some aspects of the present disclosure, as set forth in the remainder of the present application and with reference to the drawings.

SUMMARY

An inductor-windings-forming apparatus and a method of manufacturing inductors is substantially shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following describes implementations may be found in the disclosed apparatus for forming inductor windings of an inductor, and a method for manufacturing inductors. As used in this disclosure, the term inductor encompasses both inductors and transformers, including transformers that are composite inductors positioned near each other sharing a magnetic field, often with different numbers of turns to step up or down a voltage with alternating current. The disclosed apparatus and method enables extremely accurate production of inductors through a repeatable, fully automated, and high-volume production process. In contrast to conventional manufacturing solutions that rely on manual or semi-automated winding of metal wires around a preformed core (e.g., an inductor core), the disclosed method employs two symmetric portions of a clamshell casing that represent two sets of electrically conductive half-turns of inductor windings that are joined to form full turns of the inductor windings. The two symmetric portions of the clamshell casing may also be referred to as clamshell halves as the portions are structurally complimentary to each other. As the symmetric portions of the clamshell casing can be manufactured using high-volume production processes, for example, stamping, cold forging, impact extruding, metal injection molding, die-casting, plastic injection molding and plating for low-current applications, the need to individually wind the metal wire around the preformed core is eliminated. Thus, the disclosed apparatus and method enables faster, more accurate, and efficient forming of inductor windings, and significantly decreases variability in comparison to existing methods that require tuning by hand, adjustment, and quality control to wind the metal wire around the preformed core with any amount of accuracy.

The inductive windings produced using conventional methods may have variations in inductance and parasitic capacitance, which may be caused by imperfections during winding. The disclosed method uses two preformed portions that are joined to form continuous inductive windings, thereby reducing variations in inductance, while precisely maintaining the inductance values within desired tolerance limits. In certain scenarios, during assembly of inductive circuits, leads of conventionally produced inductive windings require precise positioning with respect to terminals on different printed circuit board assemblies (PCBAs) or power electronic components. The disclosed apparatus and method further reduces such leads alignment issues related to positioning of the leads while connecting to different PCBAs or other circuitries.

Figure 1:
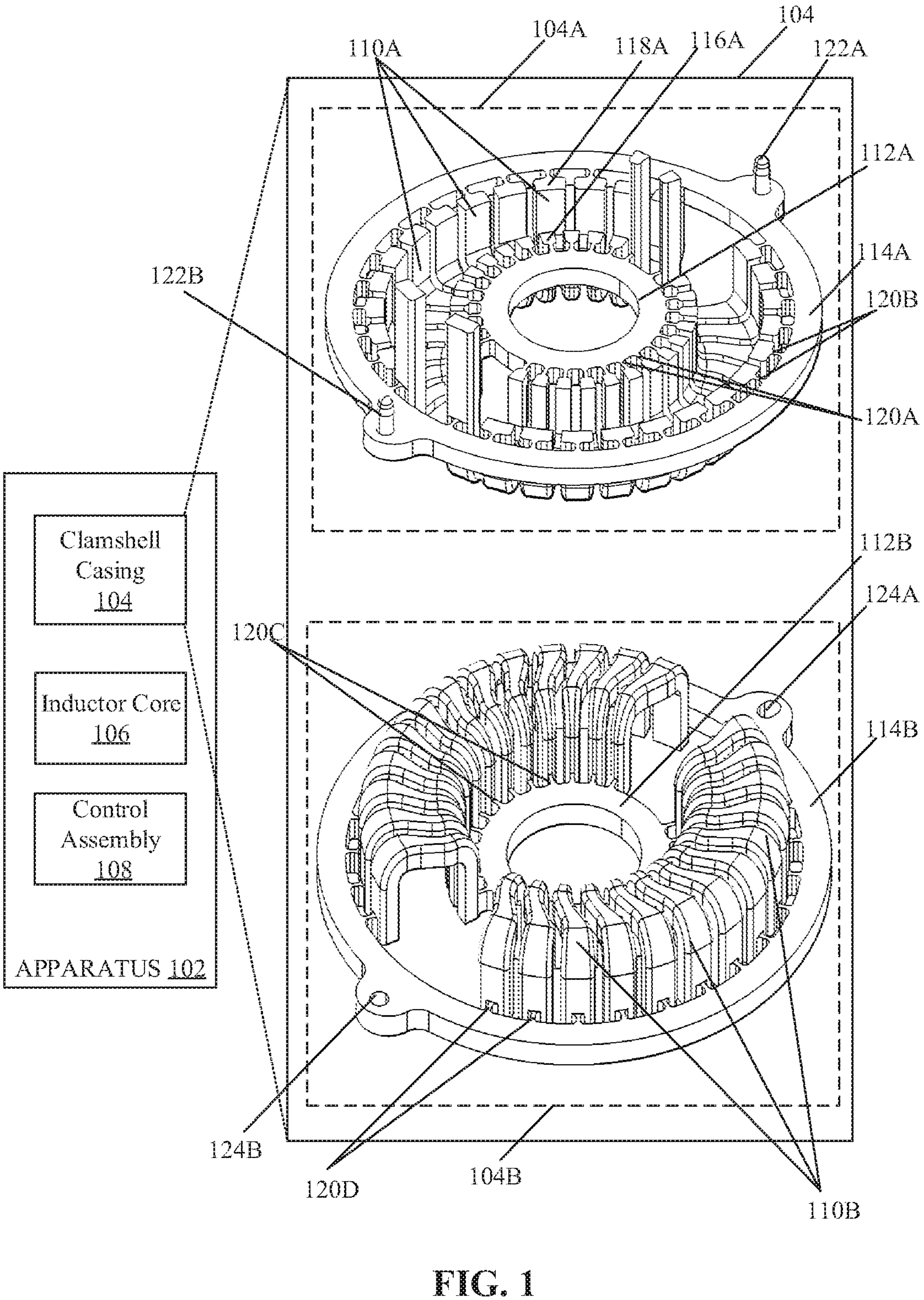
FIG. 1 illustrates different components of an apparatus for forming inductor windings of an inductor, in an embodiment of the disclosure.

FIG. 1 illustrates different components of an apparatus for forming inductor windings of an inductor, in an embodiment of the disclosure. With reference to FIG. 1, apparatus 102 includes clamshell casing 104, an inductor core 106, and a control assembly 108. The clamshell casing 104 includes a first portion 104A and a second portion 104B. The first portion 104A and the second portion 104B are symmetric and complimentary to each other but can contain different geometry for terminating the leads.

In embodiments, the first portion 104A and the second portion 104B of the clamshell casing 104 are each one half. In other embodiments, the first portion 104A is more than half of the clamshell casing 104 and the second portion 104B is less than less than half of the clam shell casing 104. In embodiments, the first portion 104A and the second portion 104B of the clamshell casing 104 are symmetric but slightly unequal portions. The first portion 104A and the second portion 104B may be formed by at least one of a plurality of defined processes that include stamping, cold forging, impact extruding, metal injection molding, die-casting, plastic injection molding and plating, or computer numerical control (CNC) machining.

The first portion 104A may include a first set of electrically conductive segments 110A, a first inner carrier 112A, and a first outer carrier 114A. The first set of electrically conductive segments 110A are held in a first pattern by the first inner carrier 112A and the first outer carrier 114A. The first inner carrier 112A and the first outer carrier 114A may act as carriers or support structure to hold the first set of electrically conductive segments 110A together. In embodiments, the first inner carrier 112A and the first outer carrier 114A has a closed-loop structure, for example, a circular or ring-shaped, a square-shaped, or a rectangular-shaped carrier. The shape of the first inner carrier 112A and the first outer carrier 114A, may be dependent on (or complimentary to) the shape of the inductor core 106. The first set of electrically conductive segments 110A that are held in the first pattern in the first portion 104A correspond to first half-turns of inductor windings. Alternatively stated, each segment of the first set of electrically conductive segments 110A act as a half-turn or a near half-turn of one complete turn of a conductive segment, such as a wire. In one example, the inductor windings may include 0.5 to "N" turns.

In an embodiment, the first portion 104A may further include a first set of breakable-tabs 120A and a second set of breakable-tabs 120B. In an embodiment, one end, such as a first end 116A (e.g., an inner end), of each segment of the first set of electrically conductive segments 110A may be connected to the first inner carrier 112A, using the first set of breakable-tabs 120A. The other end, such as a second end 118A (e.g., an outer end), of each of the first set of electrically conductive segments 110A may be connected to the first outer carrier 114A, using the second set of breakable-tabs 120B, as shown.

In an embodiment, similar to the first portion 104A, the second portion 104B include a second set of electrically conductive segments 110B, a second inner carrier 112B, and a second outer carrier 114B. The second set of electrically conductive segments 110B may be held in a second pattern using the second inner carrier 112B and the second outer carrier 114B. The shape of the second inner carrier 112B and the second outer carrier 114B may be same or similar to that of the first inner carrier 112A and the first outer carrier 114A. The second set of electrically conductive segments 110B that are held in the second pattern correspond to second half-turns of the inductor windings. The second pattern of the second set of electrically conductive segments 110B may be symmetric to the first pattern of the first set of electrically conductive segments 110A of the first portion 104A.

In an embodiment, the second portion 104B may further include a third set of breakable-tabs 120C and a fourth set of breakable-tabs 120D. In an embodiment, one end, such as an inner end 116B, of each segment of the second set of electrically conductive segments 110B may be connected to the second inner carrier 112B, using the third set of breakable-tabs 120C. The other end, such as an outer end 118B, of each of the second set of electrically conductive segments 110B may be connected to the second outer carrier 114B, using the fourth set of breakable-tabs 120D, as shown.

In an embodiment, the first portion 104A and the second portion 104B may include common reference points to enable automated alignment of the first portion 104A to the second portion 104B of the clamshell casing 104 by the control assembly 108. For example, the first portion 104A may include at least two guide pins, such as the guide pins 122A and 122B. The guide pins 122A and 122B may be provided on the first outer carrier 114A of the first portion 104A. The second outer carrier 114B of the second portion 104B of the clamshell casing 104 may include at least two perforations, such as perforations 124A and 124B. The guide pins 122A and 122B and the perforations 124A and 124B act as reference points to enable precise and automated alignment of the first portion 104A to the second portion 104B of the clamshell casing 104 by the control assembly 108. In embodiments, instead of guide pins, reference color markers, indicators, or other reference points may be utilized to automate alignment of the first portion 104A to the second portion 104B for joining at a later stage.

In an embodiment, the first portion 104A or the second portion 104B has only an inner carrier 112 or an outer carrier 114. In another embodiment, the first portion 104A or the second portion 104B does not have an inner carrier 112 or an outer carrier 114. In such a situation, the first portion 104A or the second portion 104B are maintained in contact using a clip, fixture, or other securing mechanism.

The inductor core 106 may be a ferrite, nanocrystalline, or an air-core. Based on the applications, the inductor core 106 may be formed of one or more specified materials by casting, machining, or pressing. Examples of the one or more specified materials may include, but are not limited to, iron powder, manganese-zinc ferrite, molybdenum permalloy powder, nickel-zinc ferrite, air, or other alloys. The inductor core 106 may have different shape based on the type of windings or a winding pattern to be achieved. For example, the inductor core 106 may have a toroid, rectangular, cylindrical, or a flat ring-like structure. The inductor core may also be an "E" shape, commonly used in transformers. The clamshell halves, such as the first portion 104A and the second portion 104B of the clamshell casing 104, may be closed (i.e., joined with each other) over the inductor core 106. In embodiments, the inductor core 106 are glued at one or more portions, such as the first portion 104A, of the clamshell casing 104 to provide support to the windings, such as the first set of electrically conductive segments 110B, and to secure the inductor core 106 from moving during the joining operation.

The control assembly 108 may be used to automate the manufacturing process of an inductor. The control assembly 108 may comprise suitable logic, circuitry, and interfaces that align the first portion 104A with the second portion 104B of the clamshell casing 104 based on one or more common reference points. For example, the second portion 104B of the clamshell casing 104 may be mounted on the first portion 104A based on insertion of the at least two guide pins (e.g., the guide pins 122A and 122B) of the first outer carrier 114A in the at least two perforations (e.g., the perforations 124A and 124B) of the second outer carrier 114B. The control assembly 108 may be configured to control joining of the first portion 104A with the second portion 104B such that the first set of electrically conductive segments 110A that correspond to the first half-turns of the inductor windings, are attached to the second set of electrically conductive segments 110B, arranged in the second pattern that correspond to the second half-turns of the inductor windings, to form continuous turns of the inductor windings around the inductor core 106.

Figure 2:
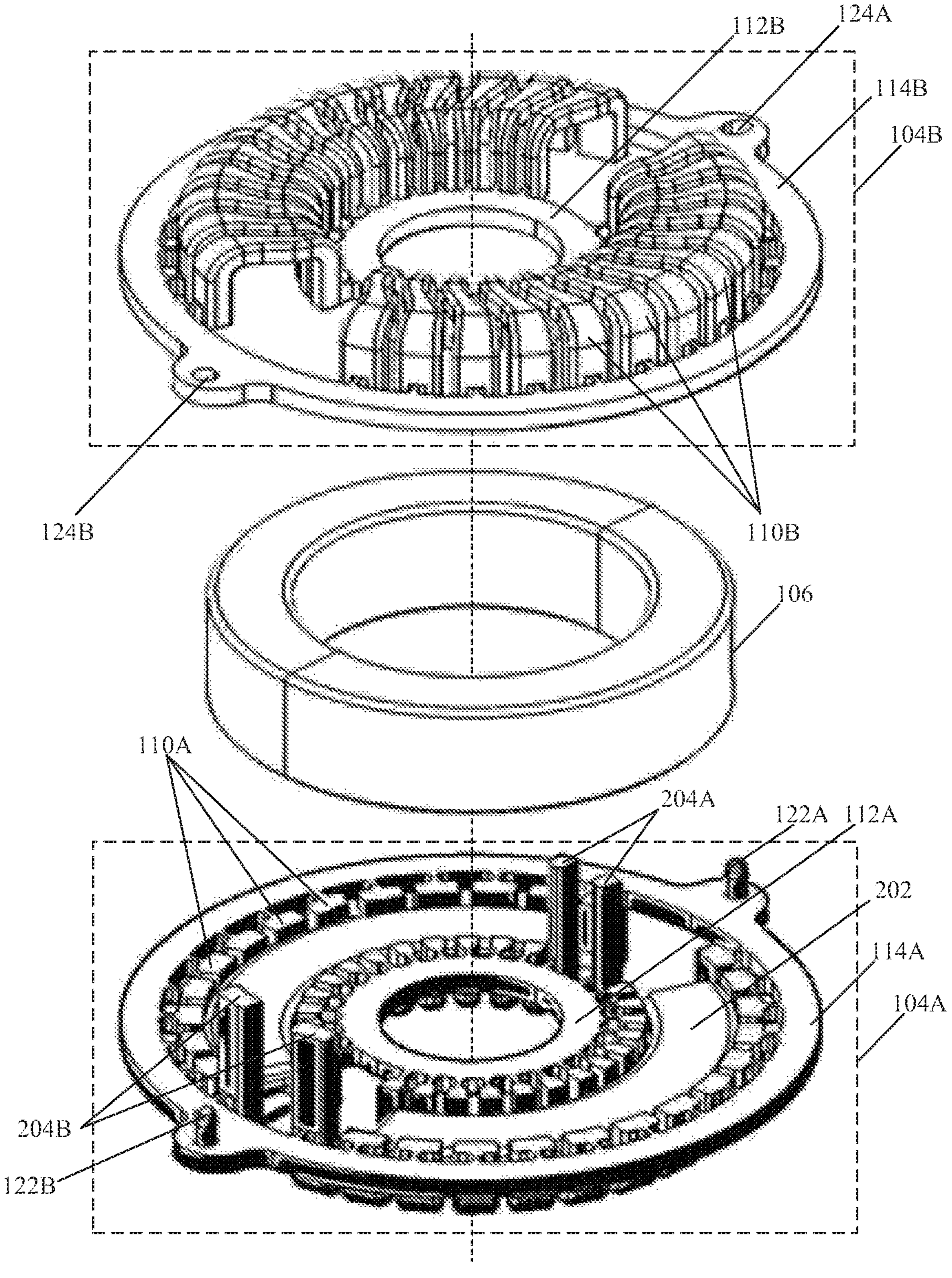
FIG. 2 illustrates an exemplary assembling operation of an inductor core within a clamshell casing, in an embodiment of the disclosure.

FIG. 2 illustrates an exemplary assembling operation of an inductor core within a clamshell casing, in an embodiment of the disclosure. FIG. 2 is explained in conjunction with elements from FIG. 1. With reference to FIG. 2, there is shown the first portion 104A, the inductor core 106, and the second portion 104B. There is also shown an adhesive 202 layered on the first set of electrically conductive segments 110A in a gap formed within the first portion 104A between the first inner carrier 112A and the first outer carrier 114A. There is also shown leads, such as inner leads 204A and outer leads 204B, in the first portion 104A.

In operation, after forming of the first portion 104A and the second portion 104B of the clamshell casing 104, a cleaning or plating operation may be performed on the first portion 104A and the second portion 104B to prepare for joining of the first portion 104A with the second portion 104B. The selection of the cleaning or plating operation may be done based on a type of joining process to be employed for the joining. For example, in case of a surface-mount technology (SMT)-based joining process, a plating operation, for example, tin over nickel may be used for plating of the first portion 104A and the second portion 104B. Cladding may be applied on the first portion 104A and the second portion 104B for a braze-based joining process. In case of a welding-based or conductive adhesive-based joining process, the first portion 104A and the second portion 104B may be cleaned using a cleaning bath. Thereafter, the inductor core 106 may be placed on the first set of electrically conductive segments 110A between the first inner carrier 112A and the first outer carrier 114A within the first portion 104A. The inductor core 106 is secured within the clamshell casing 104 by affixing the inductor core 106 within at least one portion, such as the first portion 104A, of the clamshell casing 104 using the adhesive 202. In embodiments, an affixing structure, such as a plastic bracket, can be used to secure or position the inductor core 106 relative to the windings.

In an embodiment, the control assembly 108 may be configured to automatically align and mount the second portion 104B of the clamshell casing 104 on the first portion 104A based on one or more common reference points. For example, the second portion 104B of the clamshell casing 104 may be mounted on the first portion 104A based on insertion of the at least two guide pins (e.g., the guide pins 122A and 122B) of the first outer carrier 114A in the at least two perforations (e.g., the perforations 124A and 124B) of the second outer carrier 114B.

In an embodiment, as the leads, such as inner leads 204A and outer leads 204B, are pre-formed in the first portion 104A, surface mounting and connection to conventional printed circuit board assemblies (PCBAs) is improved. This eliminates the need to manually position or align such leads (e.g., termination leads), while joining different PCBAs or other circuitries. Further, alignment issues related to the positioning of the leads are significantly reduced as compared to conventional manufacturing setups that involve production of inductor windings. The leads, such as inner leads 204A and outer leads 204B, also provide support to secure the inductor core 106 during the assembly of the inductor core 106 within the first portion 104A of the clamshell casing 104.

Figure 3:
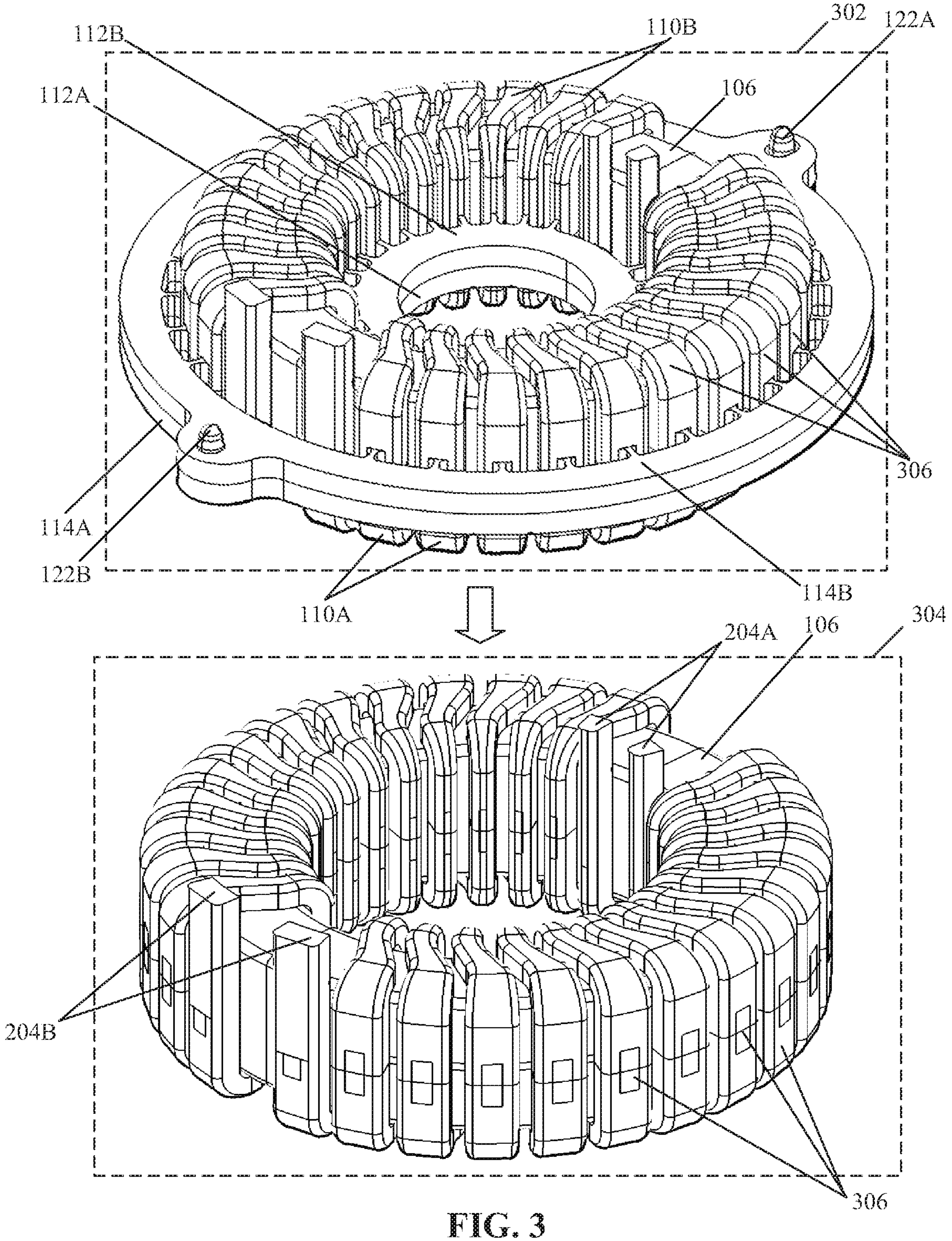
FIG. 3 illustrates an exemplary trimming operation on an exemplary joined clamshell casing to remove excess material used to hold windings together prior to joining, in an embodiment of the disclosure.

FIG. 3 illustrates an exemplary trimming operation on an exemplary joined clamshell casing to remove excess material used to hold inductor windings together prior to joining, in an embodiment of the disclosure. FIG. 3 is explained in conjunction with elements from FIGS. 1 and 2. With reference to FIG. 3, there is shown a joined clamshell casing 302 and an inductor 304 that includes continuous turns 306 of the inductor windings around the inductor core 106.

After the automated alignment and mounting of the second portion 104B of the clamshell casing 104 on the first portion 104A, the control assembly 108 may be further configured to join the first portion 104A with the second portion 104B. The first portion 104A may be joined with the second portion 104B such that the first set of electrically conductive segments 110A that correspond to the first half-turns of the inductor windings are attached to the second set of electrically conductive segments 110B that correspond to the second half-turns of the inductor windings, to form continuous turns 306 of the inductor windings around the inductor core 106. The first set of electrically conductive segments 110A may be arranged in a first pattern that represent the first half-turns of the inductor windings. The second set of electrically conductive segments 110B may be arranged in a second pattern that corresponds to the second half-turns of the inductor windings. The second pattern may be symmetric to the first pattern to allow precise joining of the first half-turns of the inductor windings to the second half-turns of the inductor windings to form the continuous turns 306 of the inductor windings around the inductor core 106. The first portion 104A may be joined with the second portion 104B to obtain the joined clamshell casing 302 that includes the inductor core 106. In an embodiment, the joining of the first portion 104A with the second portion 104B may be done using at least one of the different types of joining processes, such as an SMT-based soldering, brazing, welding, laser welding, or a conductive adhesive-based joining process.

In an embodiment, after the joining operation, excess material or support structures used to hold the windings together (e.g., the first set of electrically conductive segments 110A and second set of electrically conductive segments 110B prior to joining, is removed. In this case, the first outer carrier 114A, the second outer carrier 114B, the first inner carrier 112A, and the second inner carrier 112B that are used as support structures is removed from the joined clamshell casing 302 to form the inductor 304 that includes the continuous turns 306 of inductor windings around the inductor core 106. The removal of the outer carrier, such as the first outer carrier 114A and the second outer carrier 114B, and the inner carrier, such as the first inner carrier 112A and the second inner carrier 112B, may be done by at least one of a plurality of trimming processes. Examples of the plurality of trimming process may include, but are not limited to, punching or shearing, sawing, laser cutting, plasma cutting, wire electrical discharge machining (EDM), water jet machining, or CNC machining. The selection of a specific trimming process from the plurality of trimming processes, may be done based on a thickness or size of inductor windings, a pattern of inductor windings, and/or a geometrical shape of the inductor core 106.

In an embodiment, the removal of the first outer carrier 114A, the second outer carrier 114B, the first inner carrier 112A, and the second inner carrier 112B from the joined clamshell casing 302, in a trimming process is facilitated by breaking of the breakable-tabs, for example, the first set of breakable-tabs 120A, the second set of breakable-tabs 120B, the third set of breakable-tabs 120C, and the fourth set of breakable-tabs 120D.

Figure 4:
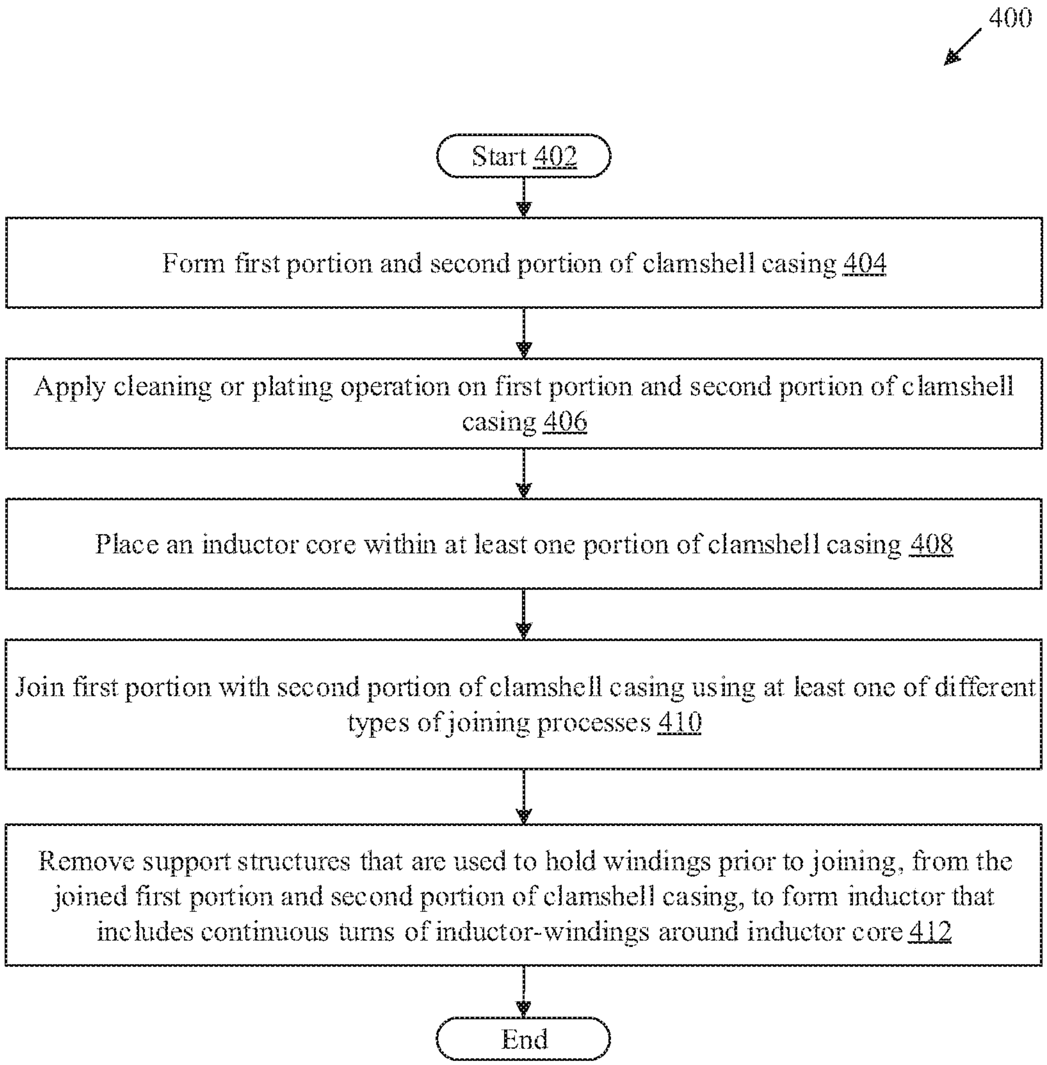
FIG. 4 is a flowchart that illustrates an exemplary method of manufacturing an inductor, in an embodiment of the disclosure.

FIG. 4 is a flowchart that illustrates an exemplary method of manufacturing of an inductor, in an embodiment of the disclosure. FIG. 4 is explained in conjunction with elements from FIGS. 1, 2, and 3. With reference to FIG. 4, there is shown a flowchart 400 that starts at 402 and proceeds to 404.

At 404, a first portion (e.g., the first portion 104A) and a second portion (e.g., second portion 104B) of a clamshell casing (e.g., the clamshell casing 104) is formed by at least one of a plurality of defined processes. Examples of the plurality of defined processes may include, but are not limited to stamping, cold forging, impact extruding, metal injection molding, die-casting, plastic injection molding and plating, or CNC machining. In embodiments, the first portion and the second portion of the clamshell casing (e.g., the clamshell casing 104) are structurally complimentary to each other and may be formed as two halves, as shown, for example, in FIG. 1. In embodiments, the first portion and the second portion of the clamshell casing are formed as symmetric but slightly unequal portions.

At 406, a cleaning or plating operation is applied on the first portion (e.g., the first portion 104A) and the second portion (e.g., second portion 104B) of the clamshell casing (e.g., the clamshell casing 104). The cleaning or plating operation may be performed on the first portion and the second portion to prepare for joining of the first portion with the second portion. The selection of the cleaning or plating operation may be done based on a type of joining process to be employed for the joining. For example, in case of the SMT-based joining process, tin over nickel plating may be used for plating of the first portion and the second portion. A cladding process may be applied on the first portion and the second portion for a braze-based joining process. In case of a welding-based or conductive adhesive-based joining process, the first portion and the second portion may be cleaned using a cleaning bath.

At 408, an inductor core (e.g. the inductor core 106) is placed and affixed within at least one portion (e.g., the first portion 104A) of the clamshell casing (e.g., the clamshell casing 104). An adhesive or an affixing structure, such as a plastic bracket, may be used to secure the inductor core (e.g. the inductor core 106) before joining the first portion and the second portion of the clamshell casing. An example of assembling of the inductor core 106 within the first portion 104A has been described in FIG. 2. As shown in FIG. 2, the inductor core 106 may be placed on the first set of electrically conductive segments 110A between the first inner carrier 112A and the first outer carrier 114A within the first portion 104A and affixed using the adhesive 202. Thereafter, the control assembly 108 may be configured to automatically align and mount the second portion 104B of the clamshell casing 104 on the first portion 104A based on one or more common reference points.

At 410, the first portion (e.g., the first portion 104A) is joined with the second portion (e.g., second portion 104B) of the clamshell casing (e.g., the clamshell casing 104) using at least one of the different types of joining processes. Examples of the different types of joining processes, may include but are not limited to, SMT-based soldering, brazing, welding, laser welding, or a conductive adhesive-based joining process. An example of the joining operation and the joined clamshell casing 302 has been shown and described in FIG. 3. The control assembly 108 may be configured to control joining of the first portion 104A with the second portion 104B such that the first set of electrically conductive segments 110A that correspond to the first half-turns of the inductor windings, are attached to the second set of electrically conductive segments 110B that correspond to the second half-turns of the inductor windings, to form continuous turns 306 of the inductor windings around the inductor core 106.

At 412, support structures (e.g., excess material) used to hold the windings (e.g., the first set of electrically conductive segments 110A and second set of electrically conductive segments 110B) together prior to joining, may be removed. The removal of the excess material or support structures (e.g., the first outer carrier 114A, the second outer carrier 114B, the first inner carrier 112A, and the second inner carrier 112B) used to hold the windings may be done by at least one of a plurality of trimming processes. Examples of the plurality of trimming process may include, but are not limited to, punching or shearing, sawing, laser cutting, plasma cutting, wire electrical discharge machining (EDM), water jet, or CNC machining. The selection of a specific trimming process from the plurality of trimming processes, may be done based on a thickness or size of inductor windings, a pattern of inductor windings, and/or a geometrical shape of the inductor core 106. The first outer carrier 114A, the second outer carrier 114B, the first inner carrier 112A, and the second inner carrier 112B may be removed from the joined first portion 104A and the second portion 104B of the clamshell casing 104 to form an inductor (e.g., the inductor 304) that includes continuous turns 306 of inductor windings around the inductor core 106.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, the present disclosure may not be limited to the particular embodiment disclosed but may include all the embodiments that fall within the scope of the appended claims. Equivalent elements, materials, processes, or steps may be substituted for those representatively illustrated and described herein. Moreover, certain features of the disclosure may be utilized independently, as would be apparent to one skilled in the art, after having read this disclosure.

As used herein, the terms “comprises,” “comprising,” “includes,” “including,” “has,” “having” or any contextual variants thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, “or” refers to an inclusive or and not to an exclusive or. For example, a condition “A or B” is satisfied by any one of the following: A is true (or present) and B is false (or not present), A is false (or not present) and B is true (or present), and both A and B are true (or present).

Although the steps, operations, or computations may be presented in a specific order, this order may be changed in different embodiments. To the extent multiple steps are shown as sequential in this specification, a combination of such steps may be performed at the same time in alternative embodiments. The sequence of operations described herein can be interrupted, suspended, reversed, or otherwise controlled by another process. It will also be appreciated that one or more of the elements depicted in the drawings/figures can also be implemented in a more separated or integrated manner, or even be removed or rendered as inoperable in certain cases, as is useful in accordance with a particular application.

What is claimed is:

1. A method for manufacturing an inductor, comprising:
- forming a first portion and a second portion of a clamshell casing,
- wherein the first portion comprises a first set of electrically conductive segments, and
- wherein the second portion comprises a second set of electrically conductive segments;
- placing an inductor core on the first set of electrically conductive segments within the first portion;
- joining the first portion with the second portion of the clamshell casing such that the first set of electrically conductive segments are attached to the second set of electrically conductive segments and
- adjusting the joined first portion and the second portion of the clamshell casing to form continuous turns of inductor windings around the inductor core.

2. The method of claim 1, wherein the first portion further comprises a first inner carrier and a first outer carrier, and wherein the inductor core is placed between the first inner carrier and the first outer carrier.

3. The method of claim 2, wherein the second portion further comprises a second inner carrier and a second outer carrier, and wherein adjusting the joined first portion and the second portion comprises removing the first outer carrier, the second outer carrier, the first inner carrier, and the second inner carrier.

4. The method of claim 2, wherein the first set of electrically conductive segments are held in a first pattern in the first portion by the first inner carrier, and the first outer carrier.

5. The method of claim 4, wherein the second set of electrically conductive segments are held in a second pattern that is symmetric to the first pattern.

6. The method of claim 5, wherein the second portion further comprises a second inner carrier and a second outer carrier, and wherein the second pattern is held using the second inner carrier and the second outer carrier.

7. A method for manufacturing an inductor, comprising:
- forming a first portion and a second portion of a clamshell casing,
- wherein the first portion comprises a first set of electrically conductive segments, and
- wherein the second portion comprises a second set of electrically conductive segments;
- placing an inductor core on the first set of electrically conductive segments within the first portion;
- joining the first portion with the second portion of the clamshell casing such that the first set of electrically conductive segments are attached to the second set of electrically conductive segments; and
- adjusting the first portion to form continuous turns of inductor windings around the inductor core.

8. The method of claim 7, wherein the first portion further comprises a first carrier, wherein the first set of electrically conductive segments are heled by the first carrier.

9. The method of claim 8, wherein the second portion further comprises a second carrier that is removed when forming the continuous turns of inductor windings around the inductor core.

10. The method of claim 8, wherein the first set of electrically conductive segments are held in a first pattern, and wherein the second set of electrically conductive segments are held in a second pattern.

11. The method of claim 8, wherein adjusting the first portion comprises removing the first carrier.

12. The method of claim 8, wherein the inductor care is placed on the first set of electrically conductive segments adjacent to the first carrier.

* * * * *